United States Patent [19]
Grossman

[11] 3,714,573
[45] Jan. 30, 1973

[54] SPREAD-SPECTRUM POSITION MONITORING SYSTEM

[75] Inventor: Burton C. Grossman, Huntington, N.Y.

[73] Assignee: Hazeltine Corporation

[22] Filed: May 6, 1970

[21] Appl. No.: 34,962

[52] U.S. Cl. .................325/32, 325/55, 325/45, 325/117, 325/122, 325/145, 343/112

[51] Int. Cl..........H04k 1/00, H04b 1/02, G01s 3/02

[58] Field of Search......325/32, 122, 39, 51, 55, 117, 325/45, 60; 343/112 R, 112 PT

[56] References Cited

UNITED STATES PATENTS

| | | |
|---|---|---|
| 3,662,267 | 5/1972 | Reed.........................................325/51 |
| 3,531,801 | 9/1970 | Huebscher..........................343/112 X |
| 3,492,581 | 1/1970 | Wisniewski..........................325/51 X |
| 3,419,865 | 12/1968 | Chisholm..............................325/117 X |
| 3,286,263 | 11/1966 | Hammack..............................343/112 |
| 3,068,473 | 12/1962 | Muth..................................343/102 X |
| 3,310,741 | 3/1967 | Uitermark et al........................325/51 |
| 3,594,790 | 7/1971 | Laughlin..............................343/6.5 R |
| 3,518,674 | 6/1970 | Moorehead et al................343/112 R |
| 3,474,460 | 10/1969 | Huebscher........................343/6.5 LC |

*Primary Examiner*—Benjamin A. Borchelt
*Assistant Examiner*—H. A. Birmiel
*Attorney*—Edward A. Onders

[57] ABSTRACT

Disclosed are systems capable of monitoring the positions of vehicles even under the multipath transmission conditions as may exist in a city. In one such system each vehicle contains apparatus which, without being interrogated, repetitively transmits a uniquely coded spread-spectrum identification signal asynchronous to the repetitive identification signals transmitted by all other system vehicles. The signal from each vehicle is received at a plurality of antenna locations and supplied to a central station where it is pulse compressed by a matched filter set to provide information from which the identity of the vehicle can be determined. The received signals are additionally processed at the central station to determine relative differences in the time of arrival of the signals at each antenna in order to determine the vehicle's position.

17 Claims, 7 Drawing Figures

POSITION MONITORING SYSTEM 10

POSITION MONITORING SYSTEM 10

SPREAD-SPECTRUM POSITION MONITORING SYSTEM

CROSS-REFERENCES TO RELATED APPLICATIONS

The present invention relates to position monitoring systems such as those described in U.S. Pat. No. 3,474,460 entitled "Position Monitoring System" and copending U.S. application Ser. No. 732,944 filed May 29, 1968 entitled "Signal Processing Apparatus," both of which are assigned to the same assignee as the present application.

BACKGROUND OF THE INVENTION

This invention relates to position monitoring systems, and more particularly to cooperative position monitoring systems, usable under conditions where multipath transmissions are caused by reflecting objects.

Present cooperative position monitoring systems either interrogate the units whose positions are to be monitored and have the units reply in prescribed time intervals or they include an accurate clock or other timing circuitry in each unit to synchronize or otherwise coordinate the transmission of signals from all system units for use in monitoring their positions and establishing their identities. In addition, such prior art systems usually transmit relatively high peak pulse power signals in order to ensure satisfactory operation over a prescribed area.

SUMMARY OF THE INVENTION

Objects of this invention are, therefore, to provide new and improved cooperative position and identity monitoring systems; to provide position and identity monitoring systems in which a plurality of mobile transmitters each automatically generates a signal without being interrogated or synchronized to any of the other transmitters; to provide position and identity monitoring systems in which each transmitter generates a unique, relatively low peak pulse power, spread-spectrum signal; to provide such systems in which the transmitted signal is decoded by remotely located receiving apparatus capable of identifying and locating each system transmitter despite multipath transmissions caused by reflecting objects, such as are normally found in a city; and to provide such systems capable of transmitting additional other information.

In accordance with the invention, there is provided a position monitoring system in which a plurality of mobile transmitters transmit modulated, spread-spectrum signals asynchronously and wherein the signals are received at a remote location for use in identifying and locating the transmitters and thereby monitoring their positions, the system comprises at least one mobile transmitter for transmitting spread-spectrum signals to a remote location for use in monitoring the transmitters' position, the transmitter comprises (a) means for generating a modulating signal having a predetermined code unique to the transmitter for use in supplying information from the transmitter; (b) means responsive to the modulating signal for generating a modulated, spread-spectrum signal, the modulated signal having modulation components which are decodable for use in supplying information from and locating the transmitter; (c) and means for transmitting the modulated spread-spectrum signal asynchronously with respect to other transmitters in the system.

In another aspect the invention includes signal receiving apparatus at the remote location for receiving a spread-spectrum signal, having unique decodable modulation components, from each of the transmitters, the receiving apparatus comprises (a) a plurality of means, each at a different station and each for receiving the signals from the transmitters; (b) signal compression means responsive to the received signals for developing a coded signal representative of the decodable components of each of the received spread-spectrum signals, all signals received from the same transmitter having decodable components unique to that transmitter; (c) means responsive to the coded signals for generating timing signals, the timing signals being representative of the difference in the time of arrival, at pairs of the receiving stations, of the signal received from each transmitter; (d) and means responsive to the timing signals and the coded signals for processing the signals to determine the position of each transmitter and information supplied from each transmitter.

For other and further objects of the present invention reference may be had to the accompanying drawings and description while the scope of the invention will be pointed out in the appended claims.

BRIEF DESCRIPTION OF THE DRAWINGS

Referring to the drawings.

DESCRIPTION OF THE INVENTION

Figure 1:
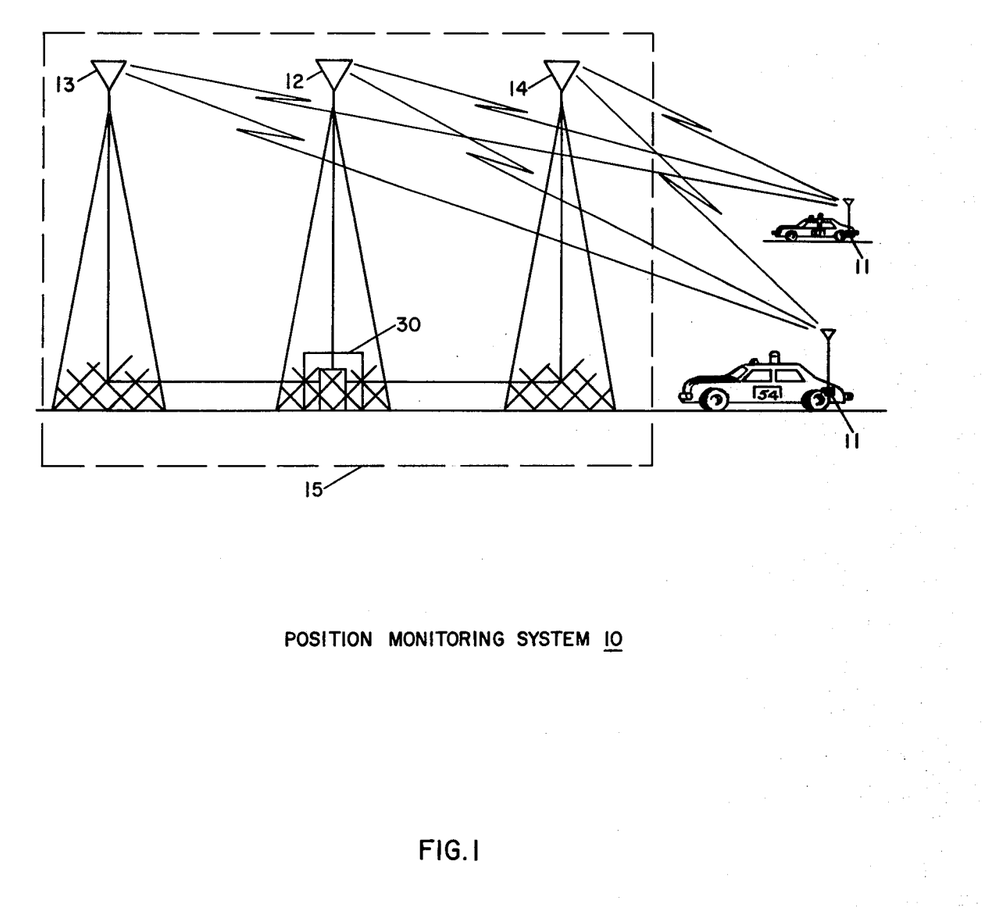
FIG. 1 is a perspective view of one form of position monitoring system in accordance with the invention, and in which a plurality of vehicles are each equipped with a system transmitter.

There is shown in FIG. 1 a perspective view of one form of position monitoring system 10 in accordance with the invention. In the particular system shown, it is desired to monitor the position and identity of each of a plurality of vehicles. Each vehicle in the system is equipped with a transmitter 11 which, as will be described below, repetitively transmits, at a low duty factor, a unique, predetermined, modulated, spread-spectrum signal that is asynchronous to signals transmitted by the other system transmitters. This signal is shown in FIG. 1 as being received by antennas 12, 13, and 14 of a receiving apparatus 15. In addition to the antennas, which are depicted in FIG. 1 as being tower-mounted for better reception, apparatus 15, which identifies and locates each transmitter 11 and thereby monitors the vehicles' positions, also includes additional circuitry shown conveniently contained at a central station 30 colocated with the tower of antenna 12. While FIG. 1 shows only two transmitter-equipped vehicles, it will be recognized that any number of transmitters may be included in such a system, provided that each one transmits a uniquely coded predetermined spread-spectrum signal, and that portions of receiving apparatus 15 located in central station 30 are constructed in accordance with the teachings of the invention so as to be capable of processing the signals received from a plurality of operating transmitters, all of which transmit asynchronously.

Figure 2:
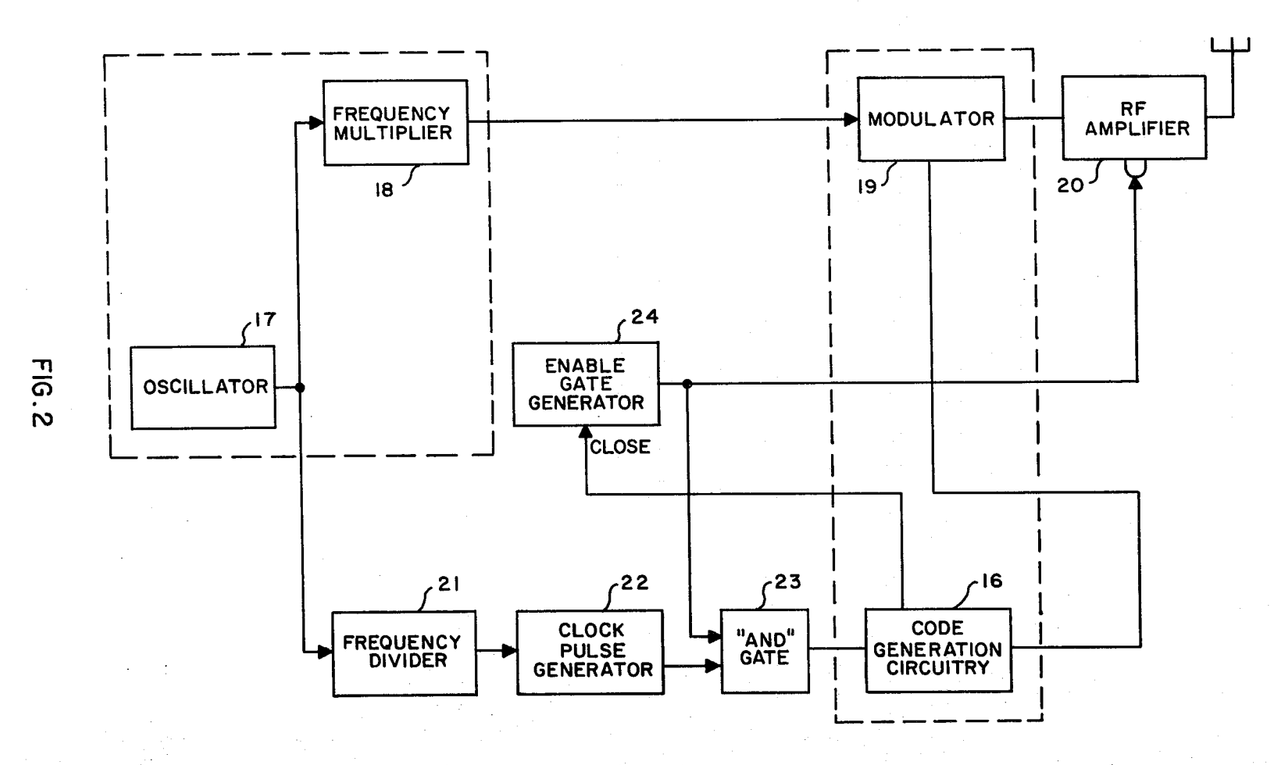
FIG. 2 is a block diagram of one form of system transmitter constructed in accordance with the invention.

THE SYSTEM TRANSMITTER OF FIG. 2

Figure 2A:
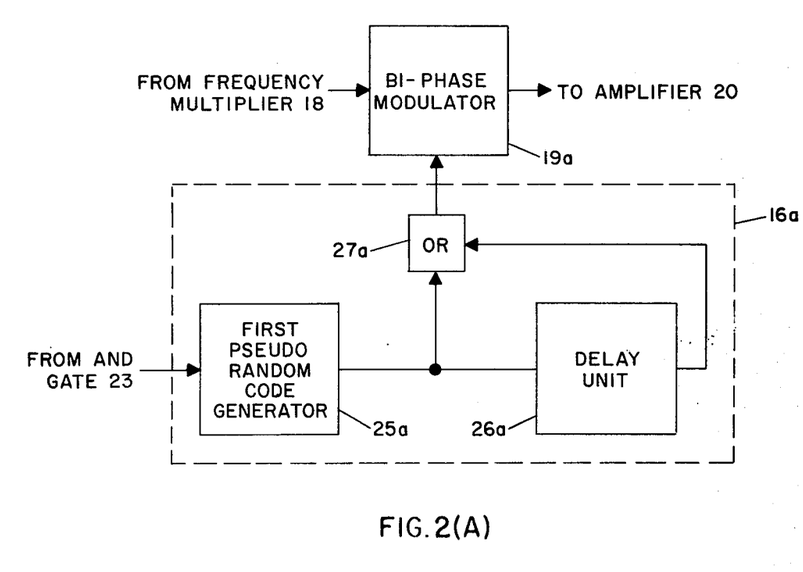
FIGS. 2a and 2b are block diagrams of variations of the transmitter shown in FIG. 2 and which also embody the invention.
Figure 2B:
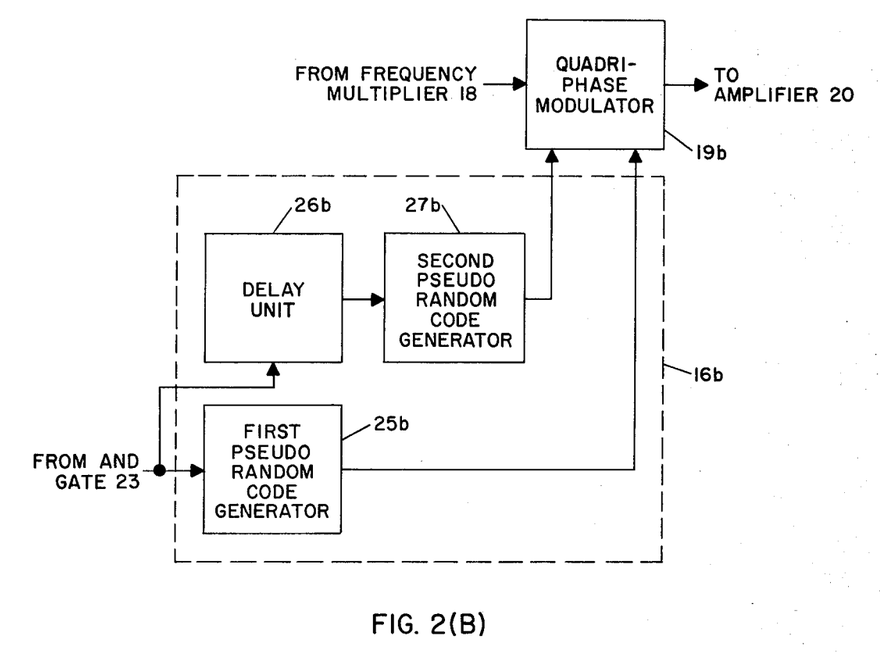

FIG. 2 is a block diagram of one form of transmitter 11 suitable for use in the FIG. 1 system, and FIGS. 2a and 2b depict two other embodiments of portions of that transmitter 11. The transmitter of FIG. 2 includes means, shown as code generation circuitry 16, for generating a modulating signal having a predetermined code unique to that particular transmitter for use in identifying that transmitter. In the embodiment illustrated, the code generation circuitry is periodically activated through AND gate 23, by an enable gate generator 24. The signal from the enable gate is terminated at the conclusion of the generation of a completed modulating signal by circuitry 16 via "close" input to gate generator 24. The spacing between enable gate signals is predetermined to be of sufficient time to reduce the probability that signals from other transmitters in the system will be received during overlapping time intervals. The code generation circuitry in the embodiment illustrated requires a basic clock pulse to operate as is well known in the art. This clock pulse is supplied through AND gate 23 when the enable gate signal is present. Since the carrier signal generating means hereinafter described utilizes an oscillator 17, a convenient method for deriving such a clock pulse is by utilizing frequency divider 21 in combination with clock pulse generator 22 to provide a clock pulse of suitable frequency. The clock pulse generator may be a conventional pulse shaping network suitable for use in the particular code generation circuitry employed.

Also included in transmitter 11 is means, shown as the combination of oscillator 17 and frequency multiplier 18 for generating a carrier signal of prescribed frequency. Further included in transmitter 11 is means shown as modulator 19, responsive to the carrier signal provided at the output of multiplier 18 and to the binary-coded modulating signal provided at the output of code generation circuitry 16, for generating a modulated spread-spectrum signal for remote transmission by transmission means, which may include RF amplifier 20 and its attendant antenna, as well as other conventional transmission components well known in the art.

The particular modulated signal developed by the modulator 19 in each transmitter 11, and thus the corresponding signal transmitted by that transmitter 11, contains different unique predetermined phase-modulated components which are decodable when received by apparatus 15 for identifying each system transmitter 11. Since the signal transmitted by each transmitter 11 is unique and thus decodable independently of signals received from all other systems transmitters and since the transmitted signal occupies a short time interval compared to the time interval between successive transmissions, each transmitter in the system can transmit asynchronously with respect to all other system transmitters without substantially degrading overall system performance.

Figure 5:
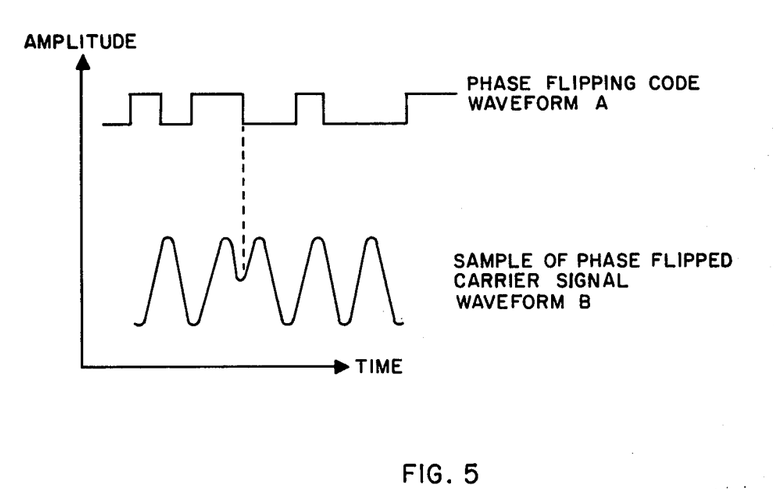
FIG. 5 depicts waveforms representative of signals generated by particular units of the apparatus of FIG. 2.

Referring now to the transmission of a spread-spectrum signal useful in the system as opposed to some prior art transmission techniques, this type of transmission has the effect of distributing the energy associated with the transmitted signal over a wide band of frequencies and an expanded time interval thus permitting a comparatively low peak pulse power transmitted signal, having a low energy density per cycle of bandwidth, to be received over a relatively wide area. In order to transmit this type of signal, code generation circuitry 16 is selected to generate a modulating signal such as waveform A of FIG. 5 which causes a rapid and pseudorandom phase flipping of the supplied carrier signal in modulator 19 thereby achieving the effect of distributing the energy spectrum associated with the modulated signal generated by modulator 19 for transmission to receiving apparatus 15.

Modulator 19 in the FIG. 2 embodiment may be a biphase modulator in which case as is well known in the art the phase of the modulated signal will change approximately 180° in response to the leading and trailing edges of each pulse (i.e. binary code digit) in the modulating signal supplied by the code generation circuitry 16. This type of phase modulation is shown by way of example in waveform A and B of FIG. 5.

In one system configuration, each transmitter 11 is as shown in the embodiment of FIG. 2, except that every transmitter 11 includes code generation circuitry 16 for repetitively generating a modulating signal having a predetermined unique sequence of pulses for use in identifying that particular transmitter 11.

FIG. 2a depicts an alternative embodiment for transmitter 11 (for use in environments where multipath is not a particular problem) which includes a code generator 16a and a bi-phase modulator 19a which are substitutable for corresponding similarly numbered components in the FIG. 2 transmitter 11 (enclosed in the dotted box in FIG. 2). Code generator 16a is shown in FIG. 2a as comprising elements 25a, 26a, and 27a. Element 25a is a first pseudorandom code generator whose input is coupled to the output of the FIG. 2 AND gate 23. In particular, first pseudorandom code generator 25a generates a selected binary-coded pulse sequence which is then delayed by delay unit 16a a predetermined time, longer than the duration of the pulse sequence, unique to that transmitter 11. This provides a delayed replica of the first pulse sequence, which together comprise the modulating signal and form the input to bi-phase modulator 19a via OR gate 27a. Since the delay provided by delay unit 26a is different for each transmitter 11, the delayed or second pulse sequence for each transmitter 11 commences a predetermined time unique to that transmitter 11 after the commencement of the first pulse sequence. The identity or other information conveyed by each transmitter 11 is then detected by receiving apparatus 15 on the basis of the unique time-spacing. Consequently, for identity purposes each transmitter in the system may contain the same pseudorandom code generator 25a but will have a different delay unit 26a which provides a predetermined delay unique for that transmitter. In alternative uses for such a system the unique code may be used to represent other information. For example in an aircraft monitoring system the code may represent altitude or ground speed.

An alternative arrangement in which a quadri-phase modulated signal is generated is provided by replacing the code generation circuitry 16 and modulator 19 of the FIG. 2 embodiment by the similarly numbered corresponding units 16b and 19b in FIG. 2b. As is known to those skilled in the art, the phase of a quadri-phase modulated signal changes substantially in increments of 90° in response to the leading and trailing edges of pulses in the modulating signal, which in this case consists of two pseudorandom codes that are supplied to the inputs of quadri-phase modulator 19b.

In detail, the variation of FIG. 2b, which is especially useful in multipath environments, includes a dual pseudorandom code generator 16b comprising elements 25b, 26b, and 27b. Code generator 25b generates a first selected sequence of binary pulses and its output is connected to one of the modulating inputs of quadri-phase modulator 19b. A delay unit 26b is serially connected to the input of a second pseudorandom code generator 27b which generates a second selected sequence of binary pulses. The output of generator 27b is connected to the second modulating input of modulator 19b, and the two pseudorandom binary sequences provided on the two modulating inputs together comprise the modulating signal. Pseudorandom code generators 25b and delay unit 26b operate in synchronism and are substantially simultaneously activated. Thus, the modulating signal consisting of the two binary pulse sequences is supplied to quadri-phase modulator 19b via the two separate modulating inputs. Pseudorandom code generators 25b and 27b may each generate the same or different binary-coded pulse sequences. In the embodiment shown two different pulse sequences are generated to facilitate identification of transmitter 11 by receiving apparatus 15 and to overcome the effects of multipath transmissions. As described with reference to the previous embodiment, the second pulse sequence commences a predetermined time after the commencement of the first pulse sequence, such time being determined by the amount of delay of unit 26b, and each particular transmitter 11 having a different predetermined delay unit 26b for providing a predetermined delay unique to that transmitter 11. Depending upon the amount of delay provided by unit 26b, the second sequence of pulses may overlap the first sequence of pulses so that pulses are simultaneously supplied to modulator 19b via the two modulating inputs. The phase of the modulated signal will, as a result of the supplied pulse sequences, then change in increments of 90° as is conventional for quadri-phase modulators.

In order to conserve primary power to the transmitter 11 and maximize system transmission capacity, signals are radiated only when code generation circuitry 16 supplies a modulating signal to modulator 19. One technique for achieving this result would be to utilize a double balanced mixer/modulator for each of the modulators 19, 19a, or 19b. Alternatively or additionally, and as shown in FIG. 2, gating circuitry may be utilized. Therefore, an enable gate generator 24 which is set to repetitively generate an enable signal of appropriate duration is shown connected to the second input of AND gate 23 and also to an inhibit input of RF amplifier 20. RF amplifier 20 is thus enabled only when code generation circuitry 16 is similarly enabled and generating the coded modulating signal.

Figure 3:
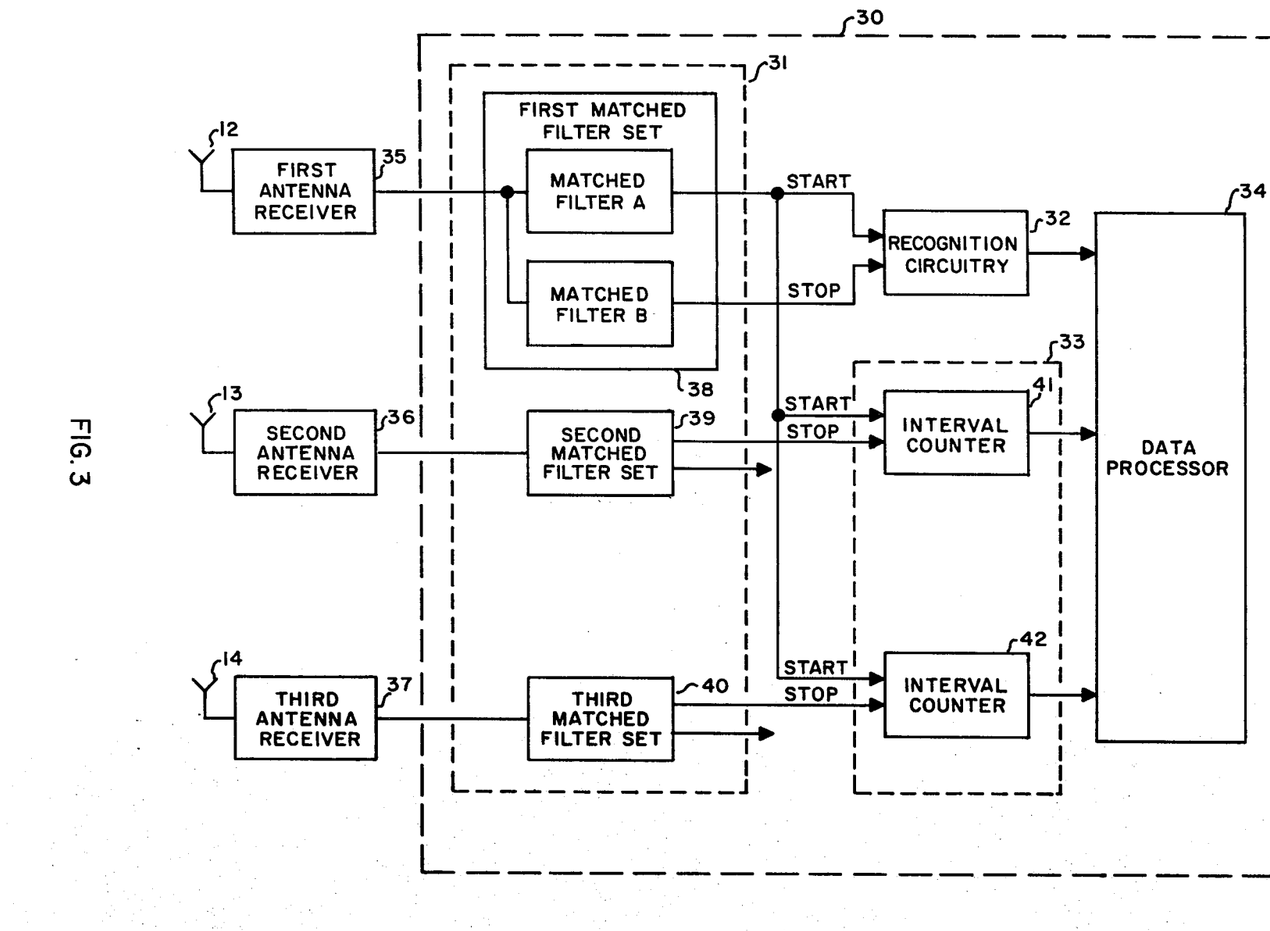
FIG. 3 is a block diagram of receiving apparatus constructed in accordance with the invention.

THE SYSTEM RECEIVING APPARATUS OF FIG. 3

Apparatus 15 has been shown in FIG. 1 to include a plurality of means such as antennas 12, 13, and 14 each at a different station for receiving signals from each of the system transmitters 11. Further included at central station 30 is the remainder of receiving apparatus 15 which includes circuitry for performing the identifying and locating functions of the system. FIG. 3 includes a block diagram of one embodiment of such identifying and locating apparatus constructed in accordance with the teachings of the invention.

Since two or more of the antennas 12, 13, and 14, and their corresponding receivers 35, 36, and 37, may be remotely located from central station 30, the signals received by these antennas are coupled to the central station 30 by suitable coupling units, such as cables, radio links, or the like.

Included in the FIG. 3 embodiment at central station 30 is signal compression means 31 which is responsive to the signals received from the antennas for developing coded signals representative of the decodable components of the received spread-spectrum signals and recognition means shown by recognition circuitry 32 responsive to the coded signals for generating signals for use in identifying the particular transmitters 11 associated with the respective coded signals. Central station 30 also includes timing means, shown as timing circuitry 33, responsive to the coded signals for generating timing signals, the timing signals being representative of the difference in the time of arrival at pairs of the fixed antennas 12, 13, and 14 of the signal received from each of the system transmitters. Further included in the central station 30 is processing means, shown as data processor 34, responsive to the timing and identification signals for processing these signals to determine the position and identity of each system transmitter 11. As will be recognized by those skilled in the art the data processor may be adapted to perform the functions of recognition circuitry 32 and timing circuitry 33 if it is desired to reduce the number of discrete elements in the system.

Antennas 12, 13, and 14 are positioned at suitable locations within the system receiving area and each has a substantially omni-azimuthal radiation characteristic for reception of signals from transmitter 11. One such arrangement of antennas includes a first antenna centrally located and at a high elevation within the area of interest with the remaining antennas located at high elevations at the fringes of the area of interest. The selection of sites for these antennas can be accomplished by one skilled in the art by taking into account such factors as transmitter power, physical characteristics and extent of the area of interest (i.e. urban or rural) topology, antenna characteristics, and receiving apparatus characteristics. However, as is known to those skilled in the art, other types of antennas may be used depending upon the particular antenna locations and the operating characteristics desired. For example, if the antennas are physically positioned on the edge of the geographical boundaries of the system, broadly directional antennas may be instead utilized.

As was previously described coupling units are inserted between the antennas and the central station 30. These coupling units have known delays which can be compensated for by data processor 34. Compensation may be necessary since measurements made at central station 30 will otherwise include the coupling unit delays, which must be eliminated to provide accurate indications of time difference at pairs of antennas, and therefore accurate indication of transmitter position as is hereinafter described. Furthermore, for ease in processing, additional fixed delay units may be included in two of the coupling channels or links so that signals from one particular channel, for example, that associated with antenna 12 will always be received at central station 30 first. In FIG. 3, receivers 35, 36, and 37 which include conventional arrangements of local oscillators, mixers, and IF amplifiers are shown directly coupled to signal compression means 31.

In the embodiment illustrated compression means 31 comprise sets of matched filters 38, 39 and 40. A set of matched filters may consist of one or more filters each of which is matched to a particular phase-coded signal. It will be recognized that if the transmitted signal contains a single coded sequence or a coded sequence and delayed replica, as described in the FIG. 2a embodiment, three single matched filters can be used as 38, 39, and 40 respectively, in the FIG. 3 embodiment. In addition, as will be recognized by those skilled in the art, filters 38, 39, and 40 can be replaced by a single time-shared matched filter set.

In the embodiment of FIG. 3, the signals received at the antennas were originally generated in response to a modulating signal having first and second binary-coded pulse sequences and in which the second pulse sequence commenced a predetermined time unique to that particular transmitter after the commencement of the first pulse sequence. If the pulse sequences are different at least one of the matched filter sets (38 in the illustration) must comprise a first matched filter depicted as matched filter "A", which is matched to and therefore decodes the first pulse sequence to provide a first pulse, and a second matched filter "B" which decodes the second pulse sequence to provide a second pulse (both for use in the recognition and timing means described hereinafter).

Additional matched filter sets 39 and 40 which may be the same as matched filter set 38, are shown responsive to the signals from second antenna receiver 36 and third antenna receiver 37, respectively. If desired, these three filter sets can be identical, and therefore time-shared so that only one such set is actually required. In addition, since only one pair of first and second pulses is needed for identity purposes, either matched filter A or matched filter B may be omitted from sets 39 and 40, in which case only one output line for example that from matched filter A is used, as shown in FIG. 3.

Recognition circuitry 32 which may be a time interval measurement counter is responsive to the coded signals developed by matched filter unit 38. In particular, the first developed pulse (from filter A) starts counter 32 and the second developed pulse (from filter B) stops counter 32. The counter output, a digital number herein called the identity signal, is supplied to data processor 34 which determines the identity of the transmitter 11 from which the signal was received based upon the fact that the time spacing between the two pulses is unique with respect to that particular transmitter 11 and is also known or predetermined in advance for each transmitter. These known unique times are stored in the memory of data processor 34 for comparison with the output of counter 32 in order to determine the identity of each of the transmitters 11.

Timing means 31 is shown as comprising first and second time interval measurement devices such as counters 41 and 42, responsive to the pulse coded signals from matched filter sets 38, 39, and 40 for generating timing signals. First counter 41 has its start input connected to the output of filter A in matched filter set 38, and the stop input connected to the output of matched filter set 39 for generating a timing signal (i.e. a digital number) representative of the difference in the time of arrival of the transmitted signal at the antenna pair consisting of antennas 12 and 13. Likewise, second counter 42 has its start input connected to the output of matched filter A of matched filter set 38 and the stop input connected to the output of third matched filter set 40 for developing a timing signal representative of the difference in time of arrival of the received signal at antennas 12 and 14. It will be recognized by those skilled in the art that a system using only two time difference measurements for determining position may introduce an ambiguous indication of position. In this event a third counter may be included in timing means 33 to obtain a timing signal representative of the difference in time of arrival of the received signals between a third pair of antennas. The purpose of the third measurement is to unambiguously resolve the position of each system transmitter within the area of interest. It will be recognized that since each time difference measurement represents a curve which can be plotted graphically, the intersection of two of these curves for the most part will provide an adequate indication of transmitter position. However, in order to ensure an unambiguous location a third curve may be employed.

If desired, the counters 41 and 42 may also be connected to an output of recognition circuitry 32 so that they are activated substantially only upon recognition of the arrival of a valid transmitter identification signal, thereby reducing the probability of the generation of timing signals due to spurious or erroneous signals received at antennas 12, 13, or 14 due to noise, other transmissions in the same frequency band, multipath transmissions, or transmissions by units not in the system.

The outputs of the counters 41 and 42 are coupled to data processor 34, as is the identifying signal developed by recognition circuitry 32. The data processor compares the identity of the transmitter 11 with a stored list of valid transmitter identities and processes the timing signals representative of the difference of the time of arrival at the pairs of fixed antennas of each transmitter signal to determine the positions of each transmitter 11. A suitable technique for obtaining location information by means of time difference measurements is described in the previously mentioned copending application which is assigned to the same assignee as is the present application.

The signals received from each system transmitter 11 may be asynchronous with respect to the signals received from all other system transmitters since every signal received from the same system transmitter has unique predetermined decodable spread-spectrum signal components corresponding to that transmitter so that the signals from different system transmitters are separately identified and located by receiving apparatus 15.

Figure 4:
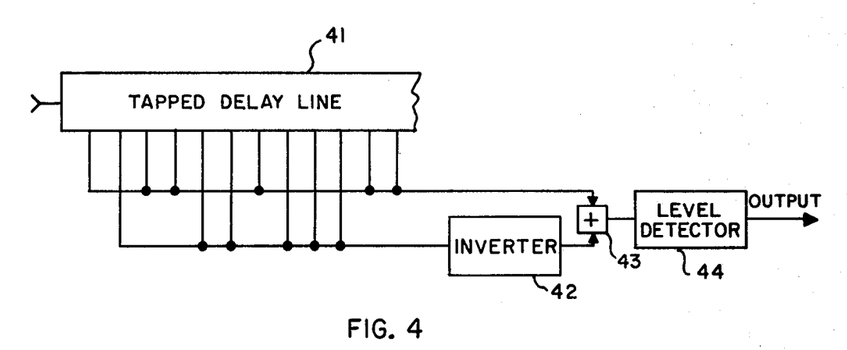
FIG. 4 is a block diagram depicting one possible construction of a matched filter useful in the embodiment of FIG. 3.

FIG. 4 depicts one suitable type of matched filter which may be used in matched filter sets 38, 39, and 40 and which includes a tapped delay line 41, inverter 42, summing circuit 43, and detector 44. The arrangement or set of tap connections is responsive to a particular predetermined binary-coded spread-spectrum signal thereby decoding the components into a pulse or pulses at the output of detector 44. Similarly, other arrangements of tap connections can be provided from the same tapped delay line 41 thus implementing a set of filters, each filter matched to a corresponding different binary-coded signal.

Parameters which may be useful in constructing a system in accordance with the invention are shown in the table below. It will be recognized by those skilled in the art that the parameters listed are presented only by way of example and many variations can be made without departing from the teachings of the invention.

EXAMPLE OF SYSTEM PARAMETERS

I. Transmitter
a. No. of transmitters — Approx. 100
b. Carrier frequency — 168 MH$_z$
c. Enable gate signal spacing — Approx. 1 per min.
d. Clock pulse rate — 6 megabits per sec.
e. No. of bits in one pulse sequence — 1023
f. Bandwidth of transmitted signal — 12 MH$_z$
g. Peak Power Output — 1–5 watts
h. Duty factor — $10^{-5}$ II. Receiver
a. Antenna pattern — Omni-azimuthal
b. Antenna gain — 6 db
c. Received frequency — 168 ± 6 MH$_z$
d. Receiver noise FIG. — 4 db.

While there have been described what are at present considered to be practical embodiments of this invention, it will be obvious to those skilled in the art that various changes and modifications may be made therein without departing from the invention and it is, therefore, aimed to cover all such changes and modifications as fall within the true spirit and scope of the invention.

WHAT IS CLAIMED IS:

1. A position monitoring system in which a plurality of mobile transmitters transmit modulated spread-spectrum signals asynchronously and wherein said signals are received at a remote location for use in identifying and locating the transmitters and thereby monitoring their positions, said system comprising:

at least one mobile transmitter for transmitting spread-spectrum signals to a remote location for use in monitoring said transmitters' position, said transmitter comprising:

means for generating a modulating signal having a predetermined code unique to said transmitter for use in supplying information from said transmitter;

means responsive to said modulating signal for generating a modulated, spread-spectrum signal, said modulated signal having modulation components which are decodable for use in supplying information from and locating said transmitter;

and means for transmitting said modulated-spread spectrum signal asynchronously with respect to other transmitters in said system;

and signal receiving apparatus at said remote location for receiving a spread-spectrum signal, having unique decodable modulation components, from each of said transmitters, said receiving apparatus comprising:

a plurality of means, each at a different station and each for receiving the signals from said transmitters; signal compression means responsive to the received signals for developing a coded signal representative of the decodable components of each of said received spread-spectrum signals, all signals received from the same transmitter having decodable components unique to that transmitter;

means responsive to the coded signals for generating timing signals, said timing signals being representative of the difference in the time of arrival, at pairs of said receiving stations, of the signal received from each transmitter;

and means responsive to the timing signals and the coded signals for processing said signals to determine the position of each transmitter and information supplied from each transmitter.

2. A position monitoring system in which a plurality of mobile transmitters transmit modulated spread-spectrum signals asynchronously and wherein said signals are received at a remote location for use in identifying and locating the transmitters and thereby monitoring their positions, said system comprising:

at least one mobile transmitter for transmitting spread-spectrum signals to a remote location for use in monitoring said transmitters' position, said transmitter comprising:

means for generating a modulating signal having first and second portions whose time spacing comprises a code unique to said transmitter for use in identifying said transmitter; means for generating a carrier signal of prescribed frequency;

means responsive to said modulating signal and said carrier signal for generating a modulated, spread-spectrum signal, said modulated signal having modulation components which are decodable for use in identifying and locating the transmitter;

and means for transmitting said modulated spread-spectrum signal asynchronously with respect to other transmitters in said system;

and signal receiving apparatus at said remote location for receiving a spread-spectrum signal, having unique decodable modulation components, from each of said transmitters, said receiving apparatus comprising:

a plurality of means, each at a different station and each for receiving the signals from said transmitters;

signal compression means responsive to the received signals from each transmitter for developing coded signals representative of the decodable components of said received spread-spectrum signals, at least one of the coded signals having first and second portions whose time spacing corresponds to the spacing between said transmitted first and second portions, all signals received from the same transmitter having a spacing between portions unique to that transmitter;

recognition means responsive to the first and second portions of said coded signals for generating signals for use in identifying the transmitters associated with the respective coded signals; means responsive to the coded signals for generating timing signals, said timing signals being representative of the difference in the time of arrival, at pairs of said receiving stations, of the signal received from each transmitter;

and means responsive to the timing signals and the identifying signals for processing said signals to determine the position and identity of each transmitter.

3. A position monitoring system in which a plurality of mobile transmitters transmit modulated spread-spectrum signals asynchronously and wherein said signals are received at a remote location for use in identifying and locating the transmitters and thereby monitoring their positions, said system comprising:

at least one mobile transmitter for transmitting spread-spectrum signals to a remote location for use in monitoring said transmitters' position, said transmitter comprising:

means for generating a modulating signal having a first selected sequence of pulses and a second selected sequence of pulses, said second pulse sequence commencing a predetermined time unique to said transmitter after the commencement of said first pulse sequence for use in identifying said transmitter;

means for generating a carrier signal of prescribed frequency; a phase modulator responsive to the carrier signal and the leading and trailing edges of each of the pulses in said first and second sequences for generating a phase-modulated, spread-spectrum signal whose phase changes a prescribed amount in response to each of said pulse edges, said modulated signal having modulation components which are decodable for use in identifying and locating the transmitter;

and means for transmitting said phase modulated spread-spectrum signal asynchronously with respect to other transmitters in said system;

and signal receiving apparatus at said remote location for receiving a phase-modulated spread-spectrum signal, having unique decodable modulation components, from each of said transmitters, said receiving apparatus comprising:

a plurality of antennas and corresponding antenna receivers, each at a different station and each for receiving the signals from said transmitters;

pulse compression means comprising a matched filter set associated with each of said antennas for developing pulse-type coded signals representative of the decodable components of each of the phase modulated spread-spectrum signals received from each transmitter, at least one of the signals having a pair of first and second pulses whose time spacing corresponds to the spacing between said transmitted first and second pulse sequences, all signals received from the same transmitter having a spacing between pulses in said pulse pair unique to that transmitter;

recognition means responsive to the pulse pair of each coded signal for generating signals for use in identifying the transmitter associated with the respective coded signals;

means responsive to the coded signals for generating timing signals, said timing signals being representative of the difference in the time of arrival, at pairs of said antennas of the signal received from each transmitter;

and means responsive to the timing signals and the identifying signals for processing said signals to determine the position and identity of each transmitter.

4. A system in accordance with claim 3 wherein said phase modulator comprises a bi-phase modulator for generating a phase-modulated signal whose phase changes substantially 180° in response to each of said pulse edges.

5. A system in accordance with claim 3 wherein said phase modulator comprises a quadri-phase modulator for generating a phase-modulated signal whose phase changes substantially in increments of 90° in response to each of said pulse edges.

6. A position monitoring system in which a plurality of mobile transmitters transmit modulated spread-spectrum signals asynchronously and wherein said signals are received at a remote location for use in identifying and locating the transmitters and thereby monitoring their positions, said system comprising:

at least one mobile transmitter for transmitting spread-spectrum signals to a remote location for use in monitoring said transmitters' position, said transmitter comprising:

means for generating a modulating signal having a first selected binary-coded sequence of pulses and a second selected binary-coded sequence of pulses, said second pulse sequence commencing a predetermined time unique to said transmitter after the commencement of said first pulse sequence for use in identifying said transmitter;

means for generating a carrier signal of prescribed frequency;

a phase modulator responsive to the carrier signal and the leading and trailing edges of each of the pulses in said first and second sequences for generating a phase-modulated, spread-spectrum signal whose phase changes a prescribed amount in response to each of said pulse edges, said modulated signal having modulation components which are decodable for use in identifying and locating the transmitter; and means for transmitting said phase-modulated spread-spectrum signal asynchronously with respect to other transmitters in said system;

and signal receiving apparatus at said remote location for receiving a phase-modulated, spread-spectrum signal, having unique decodable modulation components, from each of said transmitters, said receiving apparatus comprising:

antenna means including first, second, and third fixed antennas and corresponding antenna receivers each at a different station and each for receiving the signals from said transmitters;

pulse compression means, including first, second, and third sets of matched filters responsive to signals received from said first, second, and third fixed antennas, respectively, and each set of filters being matched to the decodable components in the transmitted signals received at each corresponding antenna, for respectively developing first, second, and third coded signals, at least one of which comprises a pair of pulses whose time spacing corresponds to the spacing between said first and second transmitted pulse sequences, all signals received from the same transmitter having a spacing between pulses in said pulse pair unique to that transmitter;

recognition means responsive to the time spacing between the pulses in said pulse pairs for generating signals for use in identifying the respective transmitters;

a plurality of time interval measurement devices, each responsive to a selected pair of first, second, and third coded signals, for generating a corresponding plurality of timing signals, said timing signals being representative of the difference in the time of arrival at pairs of said fixed antennas of the signal received from each transmitter;

and means responsive to the timing and identification signals for processing said signals to determine the position and identity of each of said transmitters.

7. A transmitter usable in a position monitoring system wherein a plurality of mobile transmitters asynchronously transmit spread-spectrum signals to a remote station for use in monitoring their positions, said transmitter comprising:

means for generating a modulating signal having a predetermined code unique to said transmitter for use in supplying information from said transmitter;

means responsive to said modulating signal for generating a modulated, spread-spectrum signal, said modulated signal having modulation components which are decodable for use in supplying information from and locating the transmitter;

and means for transmitting said modulated, spread-spectrum signal asynchronously with respect to other transmitters in said system.

8. A transmitter as described in claim 7 wherein said means for generating a modulating signal generates a pulse-type sequence which comprises a code unique to said transmitter for use in identifying said transmitter.

9. A transmitter usable in a position monitoring system wherein a plurality of mobile transmitters asynchronously transmit spread-spectrum signals to a remote station for use in monitoring their positions, said transmitter comprising:

means for generating a modulating signal having first and second portions whose time spacing comprises a code unique to said transmitter for use in identifying said transmitter;

means for generating a carrier signal of prescribed frequency;

means responsive to said modulating signal and said carrier signal for generating a modulated, spread-spectrum signal, said modulated signal having modulation components which are decodable for use in identifying and locating the transmitter; and means for transmitting said modulated, spread-spectrum signal asynchronously with respect to other transmitters in said system.

10. A transmitter as described in claim 9, wherein said modulating signal generating means, generates a modulating signal having a first selected sequence of pulses and a second selected sequence of pulses, said second pulse sequence commencing a predetermined time unique to said transmitter after the commencement of said first pulse sequence for use in identifying said transmitter;

and wherein said spread-spectrum signal generating means is responsive to the leading and trailing edges of each pulse in both said sequences for generating a phase-modulated, spread-spectrum signal whose phase changes a prescribed amount in response to each of said pulse edges.

11. A transmitter as described in claim 10 wherein said spread-spectrum signal generating means comprises a bi-phase modulator for generating a phase-modulated signal whose phase changes substantially 180° in response to each of said pulse edges.

12. A transmitter as described in claim 10 wherein said spread-spectrum signal generating means comprises a quadriphase modulator for generating a phase-modulated signal whose phase changes substantially in increments of 90° in response to each of said pulse edges.

13. Signal receiving apparatus usable in a position monitoring system wherein a predetermined modulated spread-spectrum signal, having unique decodable components is received from each of a plurality of mobile transmitters for use in identifying and locating said transmitters, which transmit asynchronously with respect to one another, said signal receiving apparatus comprising:

a plurality of means, each at a different station, and each for receiving the signals from said transmitters;

signal compression means responsive to the received signals for developing a coded signal representative of the decodable components of each of said received spread-spectrum signals, all signals received from the same transmitter having decodable components unique to that transmitter;

timing means responsive to the coded signals for generating timing signals, said timing signals being representative of the difference in the time of arrival, at pairs of said receiving stations, of the signal received from each transmitter;

and processing means responsive to the timing signals and the coded signals for processing said signals to determine the position and identity of each transmitter.

14. Signal receiving apparatus usable in a position monitoring system wherein a predetermined modulated spread-spectrum signal, having decodable components representative of first and second portions whose time spacing comprises a unique code, is received from each of a plurality of mobile transmitters for use in identifying and locating said transmitters which transmit asynchronously with respect to one another, said signal receiving apparatus comprising:

a plurality of antennas and corresponding antenna receivers, each at a different station and each for receiving the signals from said transmitters;

signal compression means responsive to the received signals from each transmitter for developing coded signals representative of the decodable components of each of said received spread-spectrum signals at least one of the coded signals having first and second portions whose time spacing corresponds to the spacing between said transmitted first and second portions, all signals received from the same transmitter having a spacing between portions unique to that transmitter;

recognition means responsive to the first and second portions of said coded signals for generating signals for use in identifying the transmitters associated with the respective coded signals;

means responsive to the coded signals for generating timing signals, said timing signals being representative of the difference in the time of arrival, at pairs of said antennas, of the signal received from each transmitter;

and means responsive to the timing signals and the identifying signals for processing said signals to determine the position and identity of each transmitter.

15. Signal receiving apparatus usable in a position monitoring system wherein a predetermined phase-modulated, spread-spectrum signal having decodable components representative of first and second pulse sequences whose time spacing comprises a unique code, is received from each of a plurality of mobile transmitters for use in identifying and locating said transmitters which transmit asynchronously with respect to one another, said signal receiving apparatus comprising:

a plurality of antennas and corresponding antenna receivers, each at a different station and each for receiving the signals from said transmitters; pulse compression means comprising a matched filter set associated with each of said antennas for developing pulse-type coded signals representative of the decodable components of each of the phase-modulated, spread-spectrum signals, received from each transmitter at least one of the coded signals having a pair of first and second pulses whose time spacing corresponds to the spacing between said transmitted first and second pulse sequences, all signals received from the same transmitter having a spacing between pulses in said pulse pair unique to that transmitter;

recognition means responsive to the pulse pair in said coded signal for generating signals for use in identifying the transmitter associated with the respective coded signals;

means responsive to the coded signals for generating timing signals, said timing signals being representative of the difference in the time of arrival, at pairs of said antennas, of the signal received from each transmitter;

and means responsive to the timing signals and the identifying signals for processing said signals to determine the position and identity of each transmitter.

16. A receiver as described in claim 15 wherein said signal compression means comprises a first matched filter associated with each of said antenna means, said matched filter being adapted to develop a first pulse representative of the decodable component due to said first transmitted pulse sequence and wherein at least one of said antennas has associated therewith a second matched filter adapted to develop a second pulse representative of the decodable component due to said second transmitted pulse sequence.

17. Signal receiving apparatus usable in a position monitoring system wherein a predetermined phase-modulated spread-spectrum signal having decodable components representative of first and second pulse sequences whose time spacing comprises a unique code, is received from each of a plurality of mobile transmitters for use in identifying and locating said transmitters which transmit asynchronously with respect to one another, said signal receiving apparatus comprising:

antenna means including first, second, and third fixed antennas and corresponding antenna receivers each at a different station and each for receiving the signals from said transmitters;

pulse compression means, including first, second, and third sets of matched filters responsive to signals received from first, second and third fixed antennas, respectively, and each set of filters being matched to the decodable components in said transmitted signals received at each corresponding antenna, for respectively developing first, second and third coded signals, at least one of which has a pair of pulses whose time spacing corresponds to the spacing between said first and second transmitted pulse sequences, all signals received from the same transmitter having a spacing between pulses in said pulse pair unique to that transmitter;

recognition means responsive to the time spacing between the pulses in said pulse pairs for generating signals for use in identifying the respective transmitters;

a plurality of time interval measurement devices each responsive to a selected pair of the first, second, and third coded signals, respectively, for generating a corresponding plurality of timing signals, said timing signals being representative of the difference in the time of arrival at pairs of said three fixed antennas of the signal received from each transmitter;

and means responsive to the timing and identification signals for processing said signals to determine the position and identity of each of said transmitters.

* * * * *